United States Patent
Guillaumon et al.

(10) Patent No.: US 6,284,385 B1
(45) Date of Patent: Sep. 4, 2001

(54) SOLAR REFLECTORS

(75) Inventors: Jean-Claude Guillaumon, Ayguesvives; Pascale Véronique Nabarra, Baziege, both of (FR)

(73) Assignee: Centre National d'Etudes Spatiales, Paris (FR)

(*) Notice: Subject to any disclaimer, the term of this patent is extended or adjusted under 35 U.S.C. 154(b) by 0 days.

(21) Appl. No.: 09/344,523

(22) Filed: Jun. 25, 1999

Related U.S. Application Data

(63) Continuation of application No. PCT/FR98/02283, filed on Oct. 26, 1998.

(30) Foreign Application Priority Data

Oct. 27, 1997 (FR) .................................................. 97 13446

(51) Int. Cl.$^7$ .............................. B32B 15/08; F16L 59/08
(52) U.S. Cl. ........................................... 428/450; 428/451
(58) Field of Search ...................................... 428/451, 450

(56) References Cited

U.S. PATENT DOCUMENTS 4,358,507 * 11/1982 Senaha et al. ...................... 428/429
4,942,083   7/1990 Smith, Jr. ........................... 428/252

FOREIGN PATENT DOCUMENTS

| 0 374 495 | 6/1990 | (EP) . |
| 2 033 461 | 12/1970 | (FR) . |
| 2 067 582 | 7/1981 | (GB) . |
| 05 313390 | 11/1993 | (JP) . |
| 05 313391 | 11/1993 | (JP) . |

* cited by examiner

Primary Examiner—D. S. Nakarani
(74) Attorney, Agent, or Firm—Jacobson Holman, PLLC

(57) ABSTRACT

The invention concerns a coating material for thermal control comprising a reflecting metal layer whether or not supported by a substrate, characterized in that the reflecting metal layer is coated with a polysiloxane transparent protective coating whereof the structure consists of two-dimensional or three-dimensional blocks mutually linked with linear chains or binding groups, said protective coat being free of chromophoric groups capable of absorbing in ultraviolet radiation above 170 nm. The invention is particularly useful in the aerospace industry.

6 Claims, No Drawings

SOLAR REFLECTORS

This is a continuation application of PCT/FR98/02283, filed Oct. 26, 1998.

BACKGROUND OF THE INVENTION

1. Field of the Invention

Various techniques are used for the thermal control of space vehicles, namely active control or passive control.

2. Description of the Prior Art

Active control uses thermal machines or systems for transferring thermal energy from one point to another. Passive control uses coating materials which have well-defined thermooptical properties, such as the solar absorption coefficient $\alpha_s$ and the infrared emissivity factor $\epsilon$.

Three categories of coating materials may be distinguished:

- cold coating materials: low $\alpha$, high $\epsilon$: $\alpha_s/\epsilon <$ (e.g. white paints, SSM, OSR);
- moderate temperature coating materials: $\alpha_s \approx \epsilon \approx 0.3$, $\alpha_s/\epsilon \approx 1$ (e.g. aluminum paints, metals);
- hot coating materials: high $\alpha_s$, high $\epsilon$ with $\alpha/\epsilon > 1$ (e.g. black paints, solar absorbers).

With regard to cold coating materials, SSM (Second Surface Mirror) materials consist of a metallized polymeric film and OSR (Optical Surface Reflector) materials consist of a metallized quartz or glass tile.

SSM polymeric films usually consist of Teflon® FEP (a tetrafluoroethylene-hexafluoropropylene copolymer), Mylar® (polyester) or Kapton® (polyimide), all from Du Pont de Nemours, which are metallized using aluminum or silver. The highest performance SSMs are of the Al/Teflon® FEP or Ag/Teflon® FEP type. OSRs usually consist of a metallized tile, 100 micrometers thick, of very pure quartz or cerium-doped glass.

The thermooptical properties of SSMs and OSRs are imparted:

- in respect of the solar absorption factor, by the deposited metal (aluminum, $\alpha_s \approx 0.10$; silver, $\alpha_s \approx 0.08$); the more transparent the quartz or polymeric film, the better the solar absorption;
- in respect of the infrared emissivity, by the polymeric film or the quartz tile; in the case of the polymeric film, the emissivity depends on the thickness $\underline{e}$ (for example, in the case of Teflon® FEP, $\approx =0.48$ for e $=25$ $\mu$m and $\epsilon$ 0.75 for e=125 $\mu$m).

The mass per unit area of SSMs and OSRs is high, given the density of Teflon® FEP (d=2.24) in the case of SSMs and of quartz (d=2.20) in the case of OSRs. The cost of these materials is very high, especially in the case of OSRs, since the vacuum deposition of metal can only be carried out on small areas (typically 5×5 cm).

If these coating materials are applied to a spacecraft, there is additionally the cost of placing (by bonding) the SSMs and OSRs (use of very expensive special tools).

There is therefore a need for high-performance thermal control coating materials which are lighter and less expensive than the current coating materials.

The invention aims to satisfy this need.

SUMMARY OF THE INVENTION

More particularly, the invention relates to a thermal control coating material comprising a metal reflecting layer optionally supported by a substrate, wherein the metal reflecting layer is coated with a transparent protective layer made of a polysiloxane which has a structure consisting of two-dimensional or three-dimensional blocks connected together by linear chains or by linking groups, said protective layer being free of chromophore groups capable of absorbing in the ultraviolet band above 170 nm.

This layer must have a very high transparency, so as not to affect the solar absorption coefficient of the metal layer, a high infrared emissivity and a degree of flexibility, in particular when the substrate is itself flexible.

The material of the invention is produced by using any method to deposit a layer of a polysiloxane having a very high transparency (transmission factor $\geq 98\%$ between 200 and 1 000 nm) and a density close to 1 on a thin shiny metal (for example aluminum or silver) layer which may be solid (for example 25 to 100 $\mu$m thick) or which may be deposited beforehand on a substrate. The substrate may be flexible or rigid, but is preferably flexible.

The polysiloxane forming the transparent layer has a structure comprising two-dimensional or three-dimensional blocks connected together by linear chains of greater or lesser length depending on the desired degree of flexibility. An entirely two-dimensional or three-dimensional polysiloxane would be rigid and brittle and would not be suitable for the intended application. As a variant, the two-dimensional or three-dimensional blocks may be connected together by linking groups, such as —O—groups, $$-\underset{\underset{O}{\|}}{C}-O-\underset{\underset{O}{\|}}{C}-$$

groups or other groups, resulting from the reaction or the condensation of two functional groups. The polysiloxanes used here have a structure corresponding to the following models:

[Structure diagram]

Three-dimensional Structure

[Structure diagram]

where R is an alkyl radical, preferably a methyl radical, and n=0, 1, 2, 3 in the case of moderately rigid structures for applications on solid metal substrates and n$\geq$4 for applications on metallized flexible substrates.

The linear chains connecting the two-dimensional or three-dimensional blocks are usually polydimethyl-siloxane chains.

The protective layer must not have any chromophore groups capable of absorbing in the ultraviolet above 170 nm, whether these groups are present in the polysiloxane or come from crosslinking agents or catalysts.

This is because, exposed to ultraviolet radiation in space, such groups would degrade the protective layer, which would impair the transparency and the thermooptical properties, especially the solar absorption factor ($\alpha_s$).

The chromophore groups to be avoided include the groups:

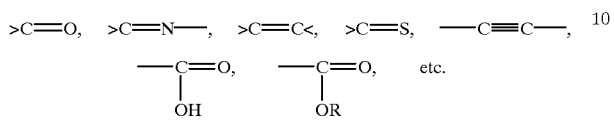

There are several ways of obtaining the polymer structures defined above:

1) using polysiloxanes having two-dimensional or three-dimensional structures and comprising radicals which either can coreact mutually, or can be crosslinked with polydimethylsiloxanes to create linear chains between the two-dimensional or three-dimensional blocks;
2) from a polysiloxane of formula

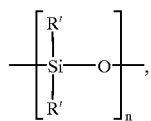

in which R' is a reactive group which allows co-crosslinking and reaction with reactive groups on other polydimethylsiloxanes.

The polymerization may take place by polyaddition or by polycondensation, depending on the reactive groups used, with or without catalysts and at room temperature or above (up to 250° C.).

Suitable reaction schemes include:

System 1:

self-crosslinking two-dimensional

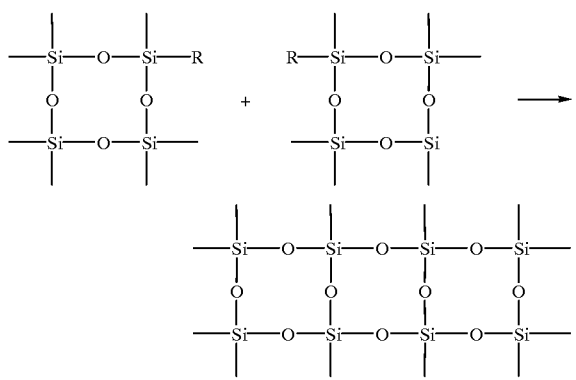

or three-dimensional

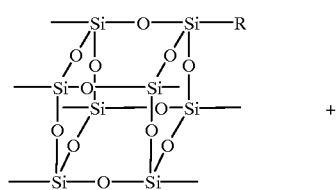

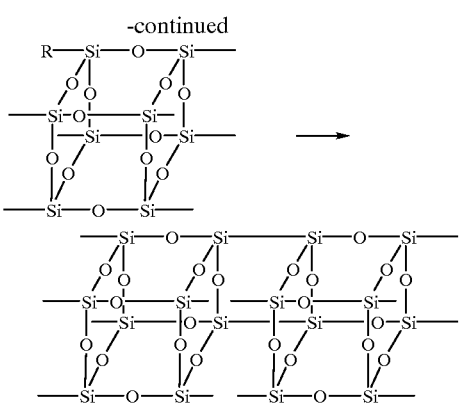

crosslinking with polydimethylsiloxanes: two-dimensional

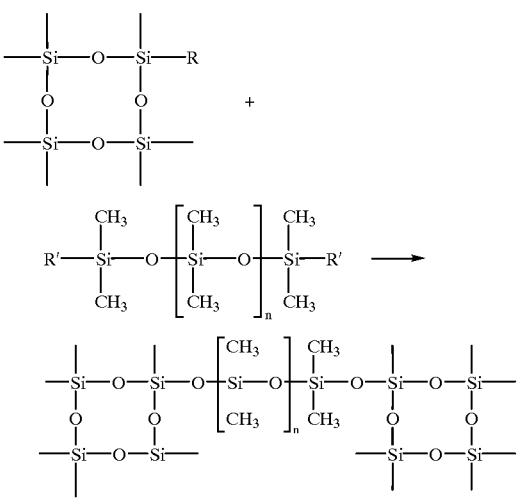

three-dimensional

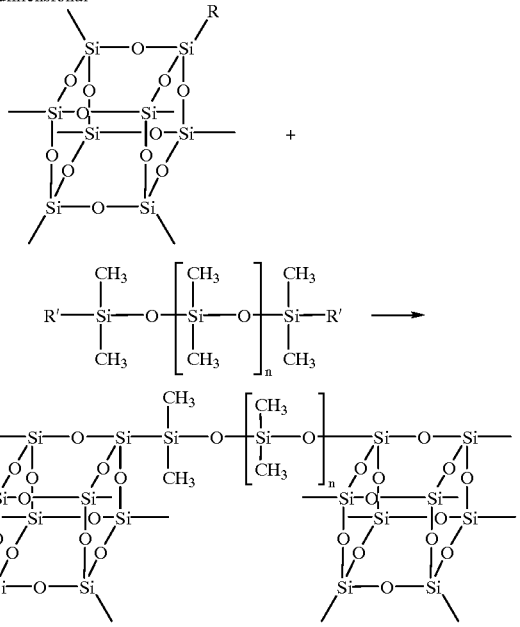

where R and R' are reactive groups and n is an integer equal to or greater than 1.

System 2:
self-crosslinking

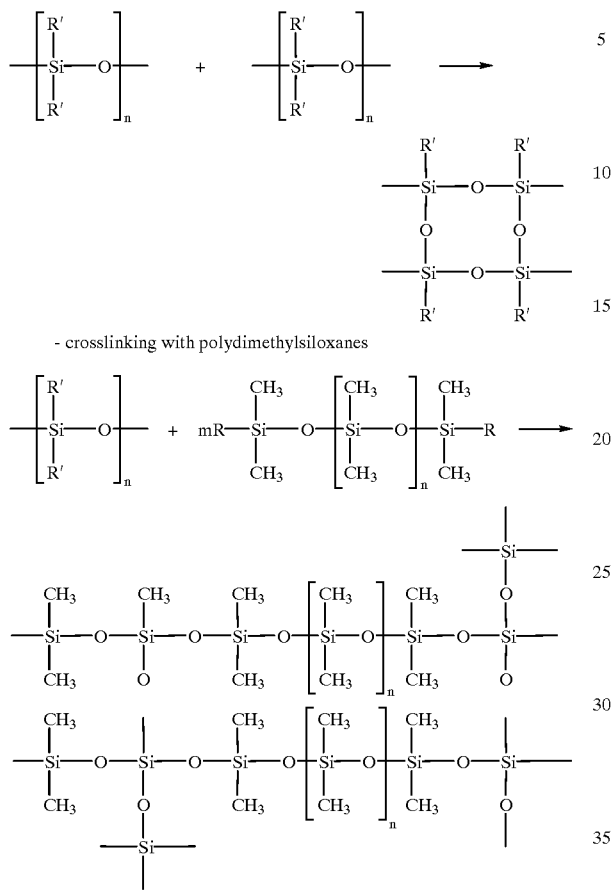

- crosslinking with polydimethylsiloxanes where R and R' are reactive groups and n and m are integers which are the same or different and equal to or greater than 1.

In the case of system 2, the products are more flexible since they comprise more polysiloxane chains than in the case of system 1.

Moreover, the shorter the polysiloxane chains, the more rigid the coatings.

Finally, the use of crosslinking agents makes it possible to increase the number of two-dimensional and three-dimensional structures.

A non-exhaustive list of comonomers which can be used in the context of system 1 is given hereinafter:

polysilesesquioxances of the type

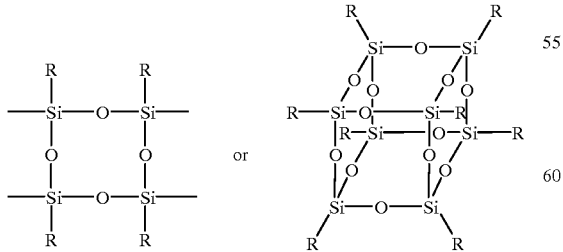

with reactive groups such as —H, —CH=CH$_2$, —OH, —Cl, —Br, —O—Me, —O—Et, —O—Ac, —N—Me$_2$, —O—N=CR$_2$, etc.;

polysiloxanes having a three-dimensional structure of the type:

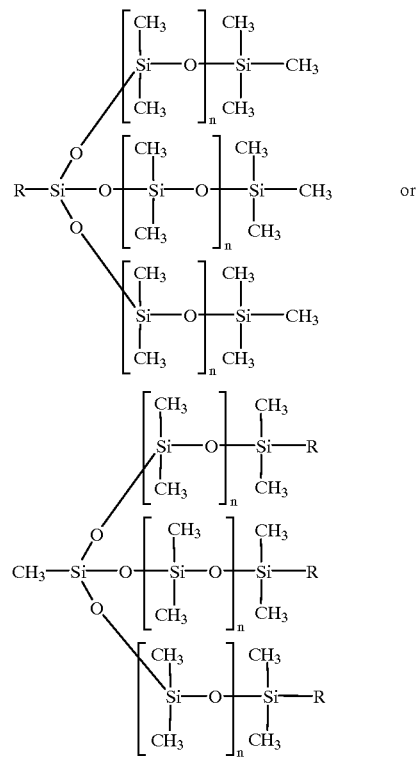

where R=—H, —CH=CH$_2$, —OH, —Cl, —Br, —OMe$_2$, —O-Et, —O—Ac, —N—Me$_2$, —O—N=CR$_2$, etc.;

polydimethylsiloxanes having reactive groups at the ends of the chain, such as : —H, —CH=CH$_2$, —OH, —Cl, —Br, —O-Me, —O-Et, —O—Ac, —N—Me$_2$, —O—N=CR$_2$, etc.

The proportions of each constituent may be varied depending on whether a product of greater or lesser flexibility is desired. These proportions may vary in the range from 10% by weight to 90% by weight for the polysiloxanes having a two-dimensional or three-dimensional structure or polydimethylsilioxany having reactive groups, the other constituents forming the balance up to 100%.

In system 2, non-limiting examples of the comonomers include:

polydiethoxysiloxane, polydimethoxysiloxane polydimethylsiloxanes having reactive groups at the ends of the chain or in the chain, such as : —H, —CH=CH$_2$, —OH, —Cl, —Br, —O-Me, —O-Et, —O—Ac, —N-Me$_2$, —O—N=CR$_2$, etc.;

a crosslinking agent such as : dimethyldiacetoxy-silane, vinylmethyldiacetoxysilane, ethyltriacetoxy-silane, methyltriacetoxysilane, vinyltriacetoxysilane, silicon tetraacetate, dimethyldiethoxysilane, 1,1,3,3-tetramethyl-1, 3-diethoxydisiloxane, methyltriethoxy-silane, methyltrimethoxysilane, dimethyltetramethoxy-disiloxane, tetraethoxysilane, tetramethoxysilane, tetra-propoxysilane, bis(N-methylbenzylamido) ethoxymethyl-silane, bis(dimethylamino) dimethylsilane, bis(dimethyl-amino)methylvinylsilane.

The relative proportions of the various comonomers may vary depending on the products desired. They may be in the range from 5% to 40% in the case of polyalkoxy-siloxanes, from 10% to 90% in the case of dimethylsiloxanes having reactive groups and from 0 to 20% in the case of crosslinking agents.

In the case of polymerization at room temperature, for both systems it is possible to use catalysts, or mixtures of catalysts, in proportions ranging from 0.01% by weight to 5% by weight with respect to the mixture. A non-limiting list of these catalysts is as follows:

- tin salts such as: dibutyltin diacetate, dibutyltin dilaurate, tin octoate, dibutyltin dioctoate, tetrabutyltin, dimethoxydibutyltin, etc.;
- zinc salts: zinc octoate, zinc acetate, etc.;
- titanium compounds: tetrabutylitatanate, tetra-ethylititanate titanate, tetraoctyl titanate, tetramethylit-tanate, tetra-n-propylititanate, etc.;
- complexes of platinum with divinyltetra-methyldisiloxane, cyclovinylmethylsiloxane, etc.

The protective layer must be applied to a polished metal surface to obtain low solar absorption coefficients.

More particularly, this surface is polished aluminum or silver formed by vacuum deposition on flexible substrates (in the case of flexible solar reflectors) or rigid substrates (equivalent to OSR : Optical Solar Reflector)).

The flexible substrates are polymeric films, such as polyimides (KAPTON®), polyesters (MYLAR®, TERPHANE®, etc.), polyethylenes, polypropylenes, polysulfones, etc., typically between 3 $\mu$m and 50 $\mu$m thick, or thin metal films (for example 10 $\mu$m to 50 $\mu$m thick).

The rigid substrates may be thin sheets of polished metal (aluminum or silver), for example 50 $\mu$m to 100 $\mu$m thick, or substrates (glass, quartz, ceramics, etc.) coated with vacuum-deposited metals.

The protective layer of the invention may be applied with a thickness of, for example, 40 $\mu$m to 50 $\mu$m to obtain a high infrared emissivity (0.75 to 0.85). These coatings may be applied as one or more layers.

If desired or necessary, the coatings of the invention may be applied to a primer layer.

The coating compositions used in the invention may also be diluted before application, to a solids content of 1% to 80%, using a solvent such as aliphatic hydrocarbons, for example hexane, heptane, octane, cyclohexane, etc., aromatic hydrocarbons, for example benzene, toluene, xylene, styrene, etc., halogenated hydrocarbons, for example trichloroethylene, methyl chloride, chloroform, etc. or mixtures thereof.

The protective layer may be applied using a paint spray gun, by brushing or by any other technique.

DETAILED DESCRIPTION OF THE PREFERRED EMBODIMENTS

The following non-limiting examples illustrate the invention.

EXAMPLE 1

The mixture obtained from polydiethoxysiloxane (3 parts by weight), polydimethylsiloxane having silanol end groups (7 parts by weight), tetramethyl-diethoxydisiloxane (4 parts by weight) and dibutyltin diacetate (0.014 parts by weight) was applied, using a spray gun, to an aluminized KAPTON substrate, to a thickness of 50 micrometers.

The thermooptical properties were:

$\alpha_s$ (solar absorption coefficient) 0.10

$\epsilon$ (infrared emissivity)=0.80 coating transmission in the range from 200 nm to 1 000 nm=99%.

EXAMPLE 2

The mixture obtained from polydiethoxysiloxane (3 parts by weight), polydimethylsiloxane having silanol end groups (4 parts by weight), tetramethyl-diethoxydisiloxane (4 parts by weight) and dibutyltin diacetate (0.014 parts by weight) was applied, using a spray gun, to an aluminized KAPTON substrate, to a thickness of 50 micrometers.

The thermooptical properties were:

$\alpha_s$=0.10, $\epsilon$=0.82 coating transmission in the range from 200 nm to 1 000 nm=99.5%.

EXAMPLE 3

The mixture obtained from polydiethoxysiloxane (3 parts by weight), polydimethylsiloxane having silanol end groups (7 parts by weight), tetramethyl-diethoxydisiloxane (2 parts by weight) and dibutyltin diacetate (0.012 parts by weight) was applied, using a spray gun, to an aluminized KAPTON substrate, to a thickness of 50 micrometers, and then cured at 100° C. for 24 hours.

The thermooptical properties were:

$\alpha_s$=0.11

$\epsilon$=0.79 coating transmission in the range from 200 nm to 1 000 nm=99%.

EXAMPLE 4

The mixture obtained from polydiethoxysiloxane (3 parts by weight), polydimethylsiloxane having silanol end groups (7 parts by weight), methyl-trimethoxysilane (4 parts by weight) and dibutyltin diacetate (0.002 parts by weight) was applied, using a spray gun, to an aluminized MYLAR substrate, to a thickness of 50 micrometers.

The thermooptical properties were:

$\alpha_s$=0.10

$\epsilon$=0.85 coating transmission in the range from 200 nm to 1 000 nm=99.5%.

EXAMPLE 5

The mixture obtained from polydiethoxysiloxane (3 parts by weight), polydimethylsiloxane having silanol end groups (4 parts by weight), tetraethoxylsilane (4 parts by weight) and dibutyltin diacetate (0.002 parts by weight) was applied, using a spray gun, to an aluminized KAPTON substrate, to a thickness of 50 micrometers.

The thermooptical properties were:

$\alpha_s$=0.10

$\epsilon$0.85 coating transmission in the range from 200 nm to 1 000 nm=99.5%.

EXAMPLE 6

The mixture obtained from polydiethoxysiloxane (3 parts by weight), polydimethylsiloxane having silanol end groups (7 parts by weight), dimethyl-diethoxysilane (4 parts by weight) and dibutyltin diacetate (0.002 parts by weight) was applied, using a spray gun, to an aluminized KAPTON substrate, to a thickness of 50 micrometers.

The thermooptical properties were:

$\alpha_s$=0.10

$\epsilon$=0.79 coating transmission in the range from 200 nm to 1 000 nm=99.5%.

EXAMPLE 7

The mixture obtained from polydiethoxysiloxane (3 parts by weight), polydimethylsiloxane having silanol end groups (7 parts by weight), methyl-triethoxysilane (4 parts by weight) and dibutyltin diacetate (0.002 parts by weight) was applied, using a spray gun, to an aluminized KAPTON substrate, to a thickness of 50 micrometers.

The thermooptical properties were:

$\alpha_s$=0.11

$\epsilon$=0.79 coating transmission in the range from 200 nm to 1 000 nm=99%.

EXAMPLE 8

The mixture obtained from polydiethoxysiloxane (3 parts by weight), polydimethylsiloxane having silanol end groups (7 parts by weight), methyltrimethoxysilane (4 parts by weight) and dibutyltin diacetate (0.014 parts by weight) was applied, using a spray gun, to an aluminized KAPTON substrate, to a thickness of 50 micrometers.

The thermooptical properties were:

$\alpha_s$=0.11 $\epsilon$=0.82 coating transmission in the range from 200 nm to 1 000 nm=99%.

EXAMPLE 9

The mixture obtained from polydiethoxysiloxane (3 parts by weight), methyltrimethoxysilane (4 parts by weight) and dibutyltin diacetate (0.001 parts by weight) was applied, using a spray gun, to an aluminized KAPTON substrate, to a thickness of 50 micrometers.

The thermooptical properties were:

$\alpha_s$=0.10

$\epsilon$=0.75 coating transmission in the range from 200 nm to 1 000 nm=99%.

EXAMPLE 10

The mixture obtained from polydimethylsiloxane having silanol end groups (7 parts by weight), methyltrimethoxysilane (4 parts by weight) and dibutyltin diacetate (0.001 parts by weight) was applied, using a spray gun, to an aluminized KAPTON substrate, to a thickness of 50 micrometers.

The thermooptical properties were:

$\alpha_s$=0.11

$\epsilon$=0.70 coating transmission in the range from 200 nm to 1 000 nm=98%.

EXAMPLE 11

The mixture obtained from polydiethoxysiloxane (3 parts by weight), polydimethylsiloxane having silanol end groups (7 parts by weight), tetraethoxysilane (4 parts by weight) and tetraoctyltin (0.03 parts by weight) was applied, using a spray gun, to an aluminized KAPTON substrate, to a thickness of 50 micrometers.

The thermooptical properties were:

$\alpha_s$=0.10

$\epsilon$=0.80 coating transmission in the range from 200 nm to 1 000 nm=99%.

EXAMPLE 12

The mixture obtained from polydiethoxysiloxane (3 parts by weight) polydimethylsiloxane having silanol end groups (7 parts by weight), methyltrimethoxysilane (4 parts by weight) and tetraethyl titanate (0.14 parts by weight) was applied, using a spray gun, to a polished aluminum substrate, to a thickness of 50 micrometers.

The thermooptical properties were:

$\alpha_s$=0.12

$\epsilon$=0.80 coating transmission in the range from 200 nm to 1 000 nm=98.5%.

EXAMPLE 13

The mixture obtained from polydiethoxysiloxane (3 parts by weight), polydimethylsiloxane having silanol end groups (7 parts by weight), methyl-trimethoxysilane (4 parts by weight) and titanium n-butoxide (0.07 parts by weight) was applied, using a spray gun, to a KAPTON substrate, to a thickness of 50 micrometers.

The thermooptical properties were:

$\alpha_s$=0.11

$\epsilon$=0.75 coating transmission in the range from 200 nm to 1 000 nm=99%.

EXAMPLE 14

The mixture obtained from polydiethoxysiloxane (3 parts by weight), polydimethylsiloxane having silanol end groups (7 parts by weight), polydimethylsiloxane having aminopropyl end groups (0.007 parts by weight) and methyltrimethoxysilane (4 parts by weight) was applied, using a spray gun, to an aluminized KAPTON substrate, to a thickness of 50 micrometers.

The thermooptical properties were:

$\alpha_s$=0.10

$\epsilon$=0.80 coating transmission in the range from 200 nm to 1 000 nm=99%.

EXAMPLE 15

The mixture obtained from polydiethoxysiloxane (3 parts by weight), polydimethylsiloxane having aminopropyl end groups (7 parts by weight) and methyl-trimethoxysilane (4 parts by weight) was applied, using a spray gun, to an aluminized KAPTON substrate, to a thickness of 50 micrometers.

The thermooptical properties were:

$\alpha_s$=0.10

$\epsilon$=0.82 coating transmission in the range from 200 nm to 1 000 nm=99%.

EXAMPLE 16

The mixture obtained from polydiethoxysiloxane (3 parts by weight), polydimethylsiloxane having silanol ends groups (7 parts by weight), polydimethylsiloxane having aminopropyl end groups (2 parts by weight) and methyltrimethoxysilane (4 parts by weight) was applied, using a spray gun, to an aluminized KAPTON substrate, to a thickness of 50 micrometers.

The thermooptical properties were:

$\alpha_s=0.11$ $\epsilon=0.84$ coating transmission in the range from 200 nm to 1 000 nm=98.5%.

EXAMPLE 17

The mixture obtained from polydiethoxysiloxane (3 parts by weight), polydimethylsiloxane having silanol end groups (7 parts by weight), polydimethylsiloxane having aminopropyl end groups (2 parts by weight) and tetramethyldiethoxydisiloxane (4 parts by weight) was applied, using a spray gun, to an aluminized KAPTON substrate, to a thickness of 50 micrometers.

The thermooptical properties were:

$\alpha_s=0.11$ $\epsilon=0.83$ coating transmission in the range from 200 nm to 1 000 nm=98%.

EXAMPLE 18

The mixture obtained from polydiethoxysiloxane (2.5 parts by weight), methyltrimethoxysilane (7.5 parts by weight), and dimethoxydibutyltin (0.005 parts by weight) was applied, using a spray gun, to an aluminized KAPTON substrate, to a thickness of 50 micrometers.

The thermooptical properties were:

$\alpha_s=0.10$ $\epsilon=0.79$ coating transmission in the range from 200 nm to 1 000 nm=99%.

EXAMPLE 19

The mixture obtained from polydiethoxysiloxane (3 parts by weight), polydimethylsiloxane having ethoxy end groups (3.5 parts by weight), polydimethyl-siloxane having silanol end groups (3.5 parts by weight) and dimethoxydibutyltin (0.005 parts by weight) was applied, using a spray gun, to an aluminized KAPTON substrate, to a thickness of 50 micrometers.

The thermooptical properties were:

$\alpha_s=0.10$ $\epsilon=0.80$ coating transmission in the range from 200 nm to 1 000 nm=99.5%.

EXAMPLE 20

The mixture obtained from polydiethoxysiloxane (3 parts by weight), polydimethylsiloxane having ethoxy end groups (3 parts by weight), polydimethylsiloxane having aminopropyl end groups (3 parts by weight) and methyltrimethoxysilane (4 parts by weight) was applied, using a spray gun, to an aluminized KAPTON substrate, to a thickness of 50 micrometers.

The thermooptical properties were:

$\alpha_s=0.11$ $\epsilon=0.85$ coating transmission in the range from 200 nm to 1 000 nm=99%.

EXAMPLE 21

The mixture obtained from polydiethoxysiloxane (3 parts by weight), polydimethylsiloxane having ethoxy end groups (1 part by weight), polydimethylsiloxane having methoxy end groups (6 parts by weight), polydimethylsiloxane having aminopropyl end groups (0.25 parts by weight), methyltrimethoxysilane (4 parts by weight) and dimethoxydibutyltin (0.005 parts by weight) was applied, using a spray gun, to an aluminized KAPTON substrate, to a thickness of 50 micrometers.

The thermooptical properties were:

$\alpha_s=0.11$ $\epsilon=0.75$ coating transmission in the range from 200 nm to 1 000 nm=98%.

EXAMPLE 22

Polysilsesquioxane having hydroxyl functional groups was applied, using a spray gun, as a 50 micrometer layer, to a polished aluminum substrate 30 micrometers thick, and then cured at 225° C. for 4 hours.

The thermooptical properties were:

$\alpha_s=0.10$ $\epsilon=0.85$ coating transmission in the range 200 nm to 1 000 nm=99%.

The reaction may take place, for example, as follows:

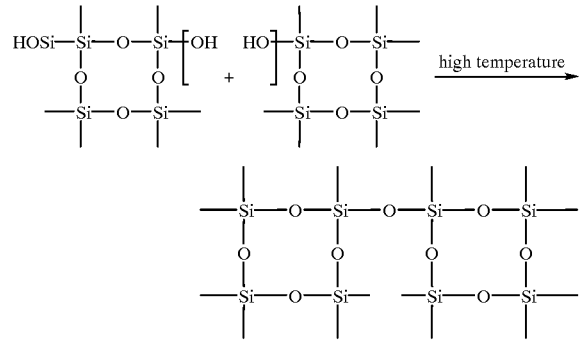

EXAMPLE 23

The mixture obtained from polysilsesquioxane having hydroxyl functional groups (20 parts by weight) and polydimethylsiloxane having silanol end groups (1 part by weight) was applied, using a spray gun, to an aluminized KAPTON substrate, to a thickness of 50 micrometers, and then cured at 225° C. for 4 hours.

The thermooptical properties were:

$\alpha_s=0.11$ $\epsilon=0.80$ coating transmission in the range from 200 nm to 1 000 nm=99%.

EXAMPLE 24

The mixture obtained from polysilsesquioxane having hydroxyl functional groups (20 parts by weight) and polydimethylsiloxane having ethoxy end groups (1 part by weight) was applied, using a spray gun, to an aluminized KAPTON substrate, to a thickness of 50 micrometers, and then cured at 250° C. for 4 hours.

The thermooptical properties were:

$\alpha_s=0.11$ $\epsilon=0.78$ coating transmission in the range from 200 nm to 1 000 nm=99%.

EXAMPLE 25

The mixture obtained from polysilsesquioxane having hydroxyl functional groups (20 parts by weight) and methyltrimethoxysilane (1 part by weight) was applied, using a spray gun, to an aluminized KAPTON substrate, to a thickness of 50 micrometers, and then cured at 225° C. for 4 hours.

The thermooptical properties were:

$\alpha_s=0.10$ $\epsilon=0.82$ coating transmission in the range from 200 nm to 1 000 nm=98%.

The linear chains came from copolymerization of the polysilsesquioxane having hydroxyl functional groups and of the methyltrimethoxysilane, as indicated below:

was applied, using a spray gun, to an aluminized KAPTON substrate, to a thickness of 50 micrometers.

The thermooptical properties were:

$\alpha_s=0.10$ $\epsilon=0.78$ coating transmission in the range from 200 nm to 1 000 nm=98.5%.

EXAMPLE 28

The mixture obtained from polysilsesquioxane having hydrogen functionality (20 parts by weight), polysiloxane having a three-dimensional structure and a vinyl group (1 part by weight; available from Gelest Inc. under reference VTT-116) and a platinum-cyclovinylmethyl-siloxane complex (0.001 parts by weight) was applied, using a spray gun, to an aluminized KAPTON substrate, to a thickness of 50 micrometers.

The thermooptical properties were:

$\alpha_s=0.11$ $\epsilon=0.83$ coating transmission in the range from 200 nm to 000 nm=99%.

What is claimed is:

1. A thermal control coating material comprising a metal reflecting layer optionally supported by a substrate, wherein

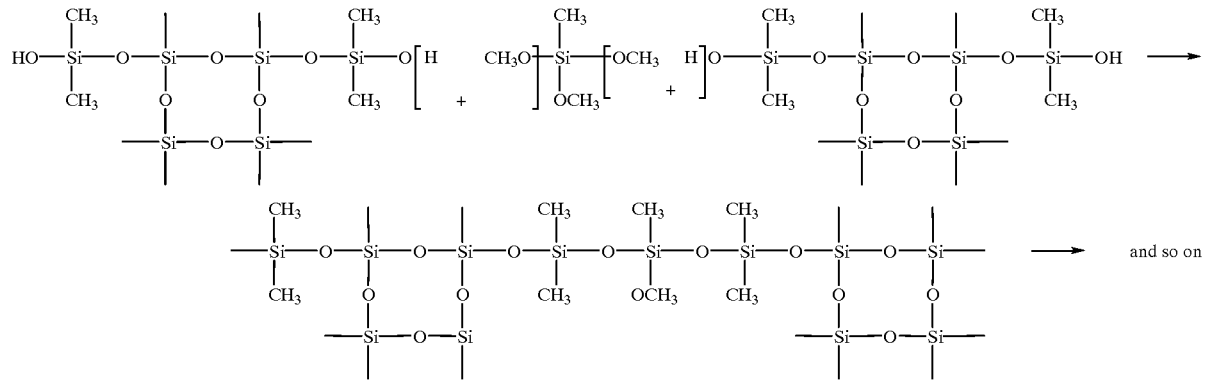

EXAMPLE 26

The mixture obtained from polysilsesquioxane having hydroxyl functional groups (20 parts by weight) and polysiloxanes having a three-dimensional structure and a hydroxyl functional group (1 part by weight; available from Gelest Inc. under reference MTV-124) was applied, using a spray gun, to an aluminized KAPTON substrate, to a thickness of 50 micrometers, and then cured at 225° C. for 4 hours.

The thermooptical properties were:

$\alpha_s=0.11$ $\epsilon=0.85$ coating transmission in the range from 200 nm to 1 000 nm=99%.

EXAMPLE 27

The mixture obtained from polysilsesquioxane having hydrogen functionality (20 parts by weight), polydimethylvinylsiloxane (1 part by weight) and a platinum-cyclovinylmethylsiloxane complex (0.001 parts by weight)

said metal reflecting layer is coated with a transparent protective layer consisting of a polysiloxane which has a structure consisting of two-dimensional or three-dimensional blocks connected together by linear chains or by linking groups, said protective layer being free of chromophore groups capable of absorbing in the ultraviolet band above 170 nm, said transparent protective layer having a transmission in the wavelength range 200 nm to 1000 nm of at least 98%.

2. The material claimed in claim 1 wherein said substrate is flexible.

3. The material claimed in claim 1 wherein said substrate is rigid.

4. A material as claimed in claim 1 which has a solar absorption coefficient less than or equal to 0.12.

5. A material as claimed in claim 1 which has an infrared emissivity factor of at least 0.70.

6. The material claimed in claim 5 wherein said factor is at least 0.80.

* * * * *